United States Patent [19]
Raets

[11] Patent Number: 5,742,470
[45] Date of Patent: Apr. 21, 1998

[54] CIRCUIT ARRANGEMENT INCLUDING AN EHT CASCADE CIRCUIT

[75] Inventor: Hubert Raets, Landgraaf, Netherlands

[73] Assignee: U. S. Philips Corporation, New York, N.Y.

[21] Appl. No.: 670,379

[22] Filed: Jun. 25, 1996

[30] Foreign Application Priority Data

Jul. 20, 1995 [DE] Germany ............. 195 26 492.4

[51] Int. Cl.$^6$ .................. H01G 4/32; H01G 4/38
[52] U.S. Cl. .......... 361/301.5; 361/328; 361/511; 361/530; 315/291; 363/15; 363/34
[58] Field of Search ............. 361/301.5, 511–515, 361/530–531, 328–330; 315/291; 323/282, 288; 363/15, 34

[56] References Cited

U.S. PATENT DOCUMENTS 3,702,414  11/1972  Janssen ................. 315/29
5,331,255  7/1994  Banbury et al. ........... 315/411
5,644,468  7/1997  Wink et al. .............. 361/330

FOREIGN PATENT DOCUMENTS 2533368  7/1975  Germany.

*Primary Examiner*—Bot L. Ledynh
*Attorney, Agent, or Firm*—Edward W. Goodman

[57] ABSTRACT

A circuit arrangement including an EHT cascade circuit (1) with at least a series arrangement (2, 3) of capacitors having staggered conductive strips (19, 20, 21, 22, 23, 24, 25) provided on both sides of a dielectric layer (18, 18a, 18b) which, together with the conductive strips (19, 20, 21, 22, 23, 24, 25), is wound about a support to constitute a winding form (15, 15a, 15b). A compact and low-cost construction, particularly for use of the circuit arrangement in an EHT generator for a picture display tube, is achieved in that the EHT cascade circuit (1) precedes an EHT output capacitor (6, 12), and in that the EHT output capacitor (6, 12) is the support.

6 Claims, 4 Drawing Sheets

CIRCUIT ARRANGEMENT INCLUDING AN EHT CASCADE CIRCUIT

BACKGROUND OF THE INVENTION

1. Field of the Invention

The invention relates to a circuit arrangement including an EHT cascade circuit with at least a series arrangement of capacitors comprising staggered conductive strips provided on both sides of a dielectric layer which, together with the conductive strips, is wound about a support to constitute a winding form.

2. Description of the Related Art

A circuit arrangement including an EHT cascade circuit is known from German Offenlegungsschrift DE-A 25 33 368. Here, a series arrangement of capacitors is formed in that conductive layers are provided on both sides of a dielectric, with the layers on one side of the dielectric partially overlapping the layers on the other side of the dielectric. The dielectric with the conductive layers is wound to a packet of strips. The single capacitors of two strip packets of this type are interconnected by means of diodes so that an EHT cascade circuit is obtained. The strip packets are wound about a support. However, such an EHT cascade circuit is very voluminous. For example, in a circuit for controlling a picture display tube, the EHT cascade circuit occupies a large part of the volume.

SUMMARY OF THE INVENTION

It is an object of the invention to provide a circuit arrangement for an EHT generator of small dimensions, supplying a stable EHT at a low cost and a high efficiency.

According to the invention, this object is solved in that the EHT cascade circuit precedes an EHT output capacitor, and in that the EHT output capacitor is the support.

By solving the object according to the invention, it is achieved that both the two series arrangements of capacitors of the EHT cascade circuit and the EHT output capacitor are integrated in one component so that the space requirement is reduced significantly. In the conventional embodiment, the EHT output capacitor is arranged as a single component next to the EHT cascade circuit and takes up a large part of the volume. Since the EHT output capacitor is the support and is thus arranged within the winding form, the EHT at the EHT output capacitor is present within the winding form so that only small leakage effects occur.

The EHT output capacitor is part of a divider circuit for frequency-independent voltage division of the output voltage of the EHT cascade circuit.

In an embodiment according to the invention, the EHT output capacitor is wound with an insulating foil, while a conductive shielding foil is wound about the insulating foil. The shielding foil connected to ground is used to reduce a coupling capacitance between the input of the EHT cascade circuit and the EHT output capacitor.

To minimize the leakage field of the EHT cascade circuit and thus avoid crosstalk effects on components arranged in the vicinity of the EHT cascade circuit, a further embodiment of the invention is characterized in that the capacitor of the series arrangement located most proximate to the output of the EHT cascade circuit is constituted by the inner windings of the winding form. It is thereby achieved that the high potentials at the output of the EHT cascade circuit are present on the inner side of the winding form. The capacitors of the EHT cascade circuit located at the input of the EHT cascade circuit are then automatically arranged externally on the winding form, so that the low potentials are present on the outer side of the winding form, which also contributes to a reduction of leakage effects.

According to the invention, a particular advantageous solution of the object is achieved by a circuit arrangement with two series arrangements of capacitors, which is characterized in that the conductive strips constituting the two series arrangements of capacitors are provided parallel to each other in the winding direction on a common dielectric layer. This results in a very compact structure. The manufacture of the two series arrangements may be effected in one cycle by providing the conductive strips in parallel on the dielectric layer. Subsequently, an insulating layer is provided on this dielectric layer, and finally the total layer packet is wound.

The envisaged object is also solved by a circuit arrangement including an EHT cascade circuit with at least a series arrangement of capacitors comprising staggered conductive strips provided on both sides of a dielectric layer which, together with the conductive strips, is wound about a support to constitute a winding form, and is characterized in that the EHT cascade circuit precedes an EHT output capacitor, and in that the EHT output capacitor is arranged outside the winding form on the central axis of the winding form. This results in a longer but very narrow arrangement so that the circuit arrangement is suitable for display tubes in which there is often very little space on the circuit board but much more space higher up.

The envisaged object is also solved by a DC converter including such a circuit arrangement, which comprises two diode-coupled series arrangements of capacitors of an EHT cascade circuit and an EHT output capacitor following the EHT cascade circuit, and is characterized in that the EHT output capacitor is the support for the winding forms constituting the two series arrangements of capacitors, and in that the EHT cascade circuit is preceded by a unit for generating an AC voltage from the DC input voltage.

The two series arrangements of capacitors of the EHT cascade circuit may alternatively be constituted by conductive strips on two separate dielectric layers which are also separately wound as two winding forms about the EHT output capacitor. This has the advantage that the capacitive coupling between the capacitors of the two series arrangements can be varied by varying the distance between the two winding forms. The larger the distance, the smaller the coupling.

The arrangement according to the invention provides the possibility of realizing EHT generators of small dimensions, low weight, good electrical and mechanical properties, great reliability and low cost. In a further embodiment of the invention, these properties render the arrangement according to the invention suitable for use in an EHT generator for a tube, particularly for a picture display tube or an X-ray tube.

These and other aspects of the invention will be apparent from and elucidated with reference to the embodiments described hereinafter.

DESCRIPTION OF THE PREFERRED EMBODIMENTS

Figure 1:
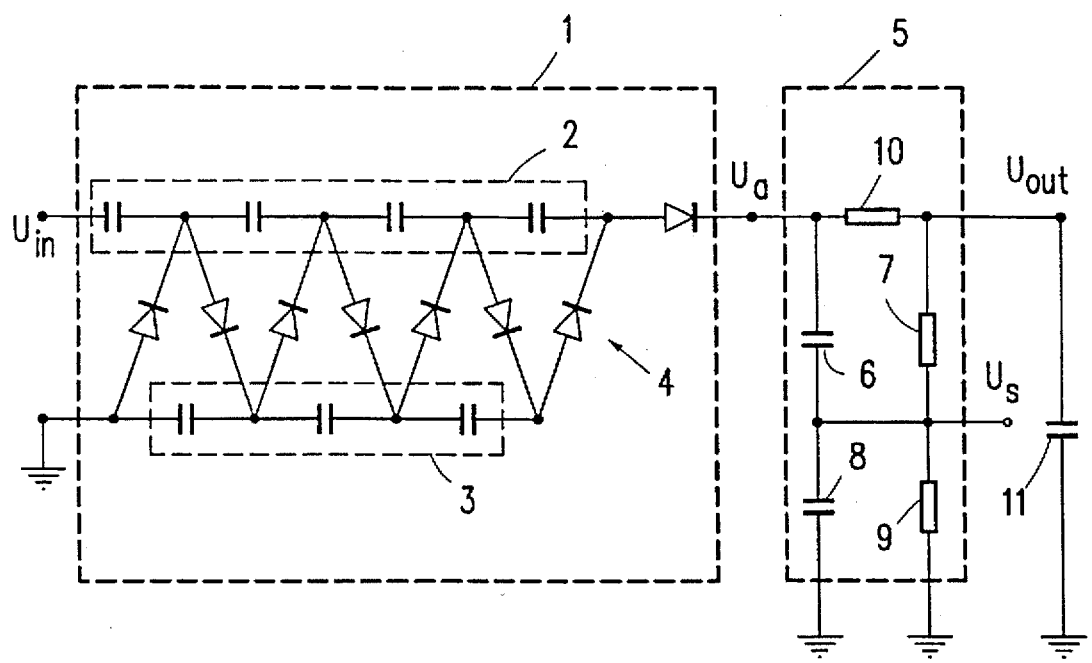
FIG. 1 is a circuit diagram of an EHT cascade circuit followed by a divider circuit for a DC converter.

In FIG. 1, the reference numeral 1 denotes an EHT cascade circuit. This EHT cascade circuit 1 is constituted by a first series arrangement 2 of capacitors and a second series arrangement 3 of capacitors which are coupled together by means of diodes 4. The circuit-technical construction of such an EHT cascade circuit 1 is known per se and will therefore not be described. The EHT cascade circuit 1 represents a multiplier circuit rectifying and multiplying the AC voltage $U_{in}$ at its input, so that a DC voltage $U_a$ having a high voltage value is present at the output of the EHT cascade circuit 1.

The EHT cascade circuit 1 precedes a divider circuit 5. This divider circuit 5 is constituted by an EHT output capacitor 6 and an EHT divider resistor 7, and by a grounded parallel circuit of a low-voltage capacitor 8 and a low-voltage divider resistor 9 connected to the junction point of these two elements. A series resistor 10 is connected to the output of the EHT cascade circuit 1 between the terminals of the EHT output capacitor 6 and the EHT divider resistor 7. The DC output voltage $U_{out}$ is taken from the junction between the series resistor 10 and the EHT divider resistor 7. The load, for example, a display tube, whose capacitive part 11, for example, the display tube capacitance, is also connected to this junction point.

The purpose of the divider circuit 5 is to perform a frequency-independent division of the output voltage $U_a$ of the EHT cascade circuit 1. A frequency-independent division is achieved when the value of the capacitor 6 multiplied by the value of the resistor 7 is equal to the value of the capacitor 8 multiplied by the value of the resistor 9. A control voltage $U_s$ is obtained at the junction point of the elements 6 to 9, this control voltage being a low-voltage representation of the voltage $U_a$ and being used for controlling the switching frequency of switches (not shown) at the input of a DC converter.

Together with the capacitive part of the output load 11, the series resistor 10 constitutes a low-pass filter which reduces a ripple in the output voltage $U_a$.

Figure 2:
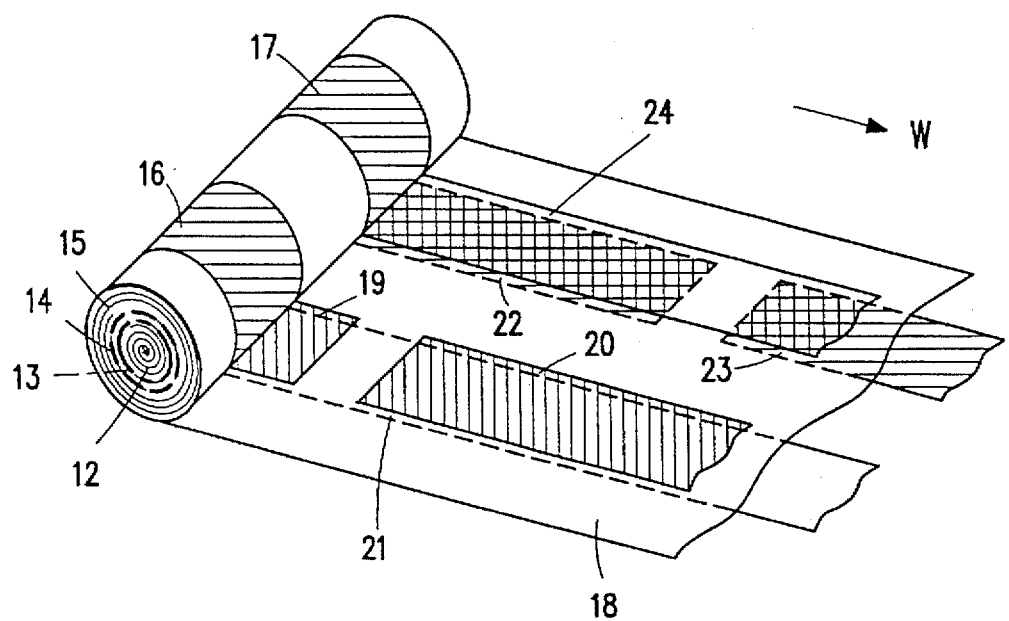
FIG. 2 shows a circuit arrangement according to the invention, consisting of capacitors of the EHT cascade circuit and the EHT output capacitor.

FIG. 2 shows a circuit arrangement according to the invention, consisting of capacitors of the EHT cascade circuit 1 and the EHT output capacitor 6. The reference numeral 12 denotes the winding of the EHT output capacitor which is implemented in known manner as a wound capacitor. An insulating foil 13 is wound about this EHT output capacitor 12, on which insulating foil a conductive film 14, for example, an aluminium film is wound for shielding purposes. The windings wound to a winding form 15 and constituting the capacitors of the EHT cascade circuit 1 are helically wound about this arrangement functioning as a support.

A plurality of parallel extending conductive strips, for example, aluminium strips are provided on both sides of a dielectric layer 18 in strip areas 16, 17. The arrangement of these conductive strips in the strip areas 16, 17 is visible on an unwound section of the winding form 15. In the lower part of FIG. 2, two strips 19 and 20 provided on the top on the dielectric layer 18 are shown, as well as a strip 21 provided on the bottom on the dielectric layer 18. A first capacitor is formed in the area where the two strips 20 and 21 overlap each other, and a second capacitor is formed in the area where the strips 19 and 21 overlap each other. An area, in which no conductive material is provided on the top on the dielectric layer 18, is present between the strips 19 and 20. These free areas serve to define the area in which a capacitive interaction is achieved between the conductive strips provided on the top and the bottom of the dielectric layer 18. The number of these free areas in the strip area 16 determines the number of capacitors of a series arrangement. The number of capacitors is one larger than the number of free areas.

As is shown in the upper part of FIG. 2, these free areas are also present on the lower side of the dielectric layer 18. In this Figure, two strips 22 and 23 provided on the bottom of the dielectric layer 18 and one strip 24 provided on the top are visible in the strip area 17.

All capacitors of the series arrangement 2 (see FIG. 1) are constituted by overlapping strips of the strip area 17, and all capacitors of the series arrangement 3 are constituted by overlapping strips of the strip area 16.

FIG. 2 does not show an insulating foil which, before winding of the winding form 15, has been laid on the dielectric foil 18 coated with the conductive strips, and subsequently wound along with this foil.

Figure 3:
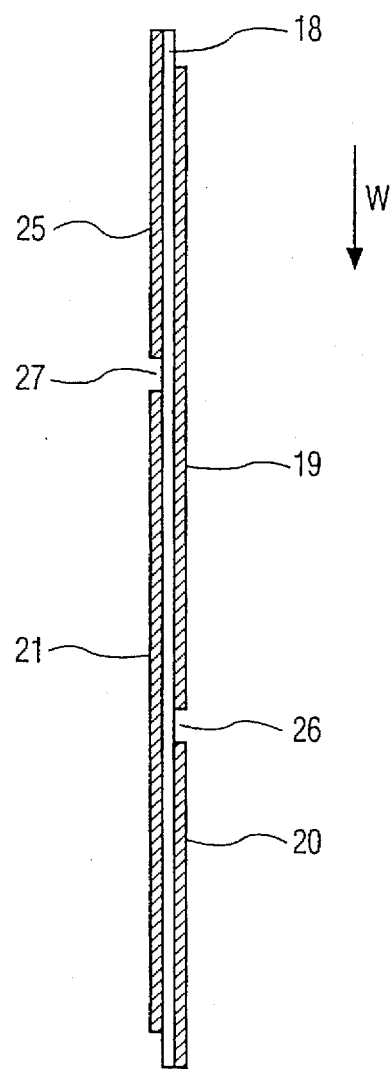
FIG. 3 shows a detail to illustrate the sequence of layers in an arrangement as shown in FIG. 2.

To illustrate the sequence of layers, FIG. 3 is a cross-section of the unwound part of the circuit arrangement shown in FIG. 2. FIG. 3 shows the dielectric layer 18, both sides of which are provided, in the winding direction W, with mutually staggered conductive strips 19, 20, 21 and 25. Free areas 26, 27 are present between the conductive strips, alternately on the upper and lower side of the dielectric layer 18.

A first capacitor is obtained in the area of overlap between the strips 19 and 25, a second capacitor is obtained in the area of overlap between the strips 19 and 21, and a third capacitor is obtained in the area of overlap between the strips 20 and 21. A connection between the first and the second capacitor is established in that the strip 19 is through-connected with respect to the free area 27 and thus has no free area. Similarly, a connection is established between the second and the third capacitor in that the strip 21 is through-connected with respect to the free area 26. The series arrangement of capacitors is obtained in that the free areas are alternately present on the lower and upper side of the dielectric layer 18.

In the embodiment shown in FIG. 2, the free areas in the strip area 16 are staggered in the winding direction W with respect to the free areas in the strip area 17. However, this is not necessarily required. The free areas may alternatively be located side by side.

Figure 4:
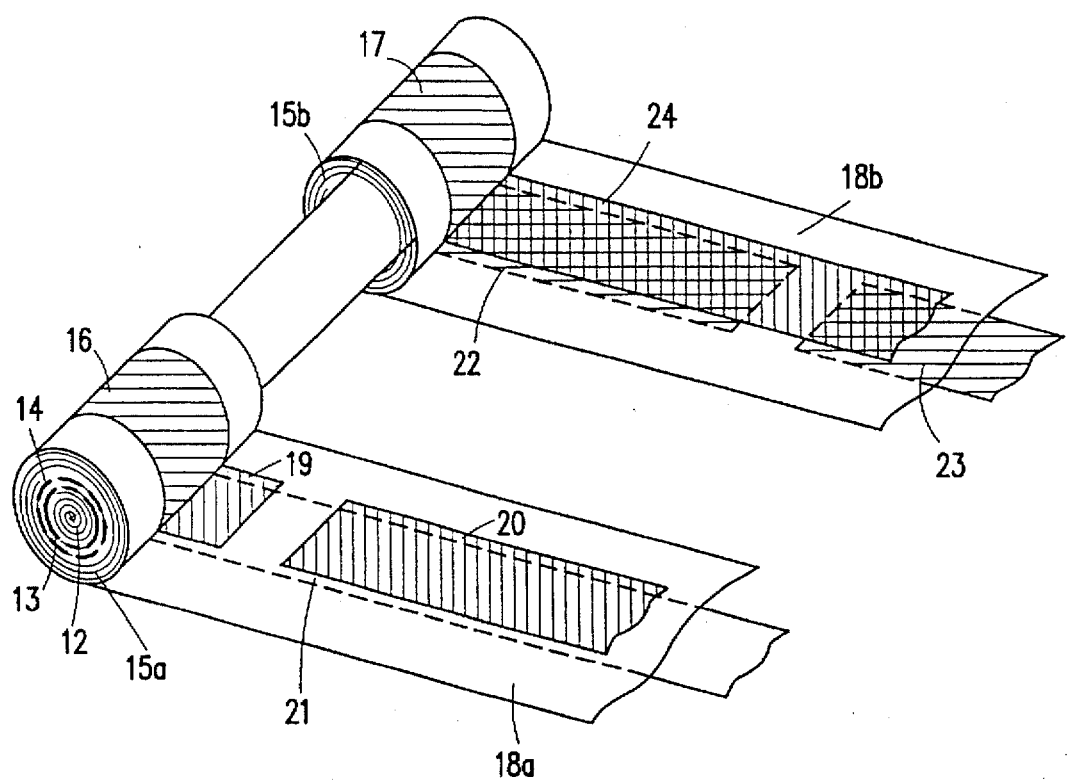
FIG. 4 shows an alternative embodiment of a circuit arrangement according to the invention.

In the alternative embodiment of a circuit arrangement according to the invention, shown in FIG. 4, the windings constituting the two series arrangements of capacitors constitute two winding forms 15a, 15b which are separated from each other. All conductive strips of the strip area 16 are provided on a first dielectric layer 18a, and all strips of the strip area 17 are provided on a second dielectric layer 18b. The EHT output capacitor is implemented as a wound capacitor 12 wound with an insulating foil 13 and a shielding foil 14. The winding forms 15a and 15b are arranged at each end of this support. This spatial separation and simultaneous increase of the distance between the winding forms 15a and 15b reduces the capacitive coupling between the capacitors of the first series arrangement, thus of the winding form 15a, and the capacitors of the second series arrangement, thus of the winding form 15b, as compared with the capacitive coupling in the arrangement shown in FIG. 2. The degree of coupling can be varied by varying the distance between the winding forms 15a and 15b.

Figure 5:
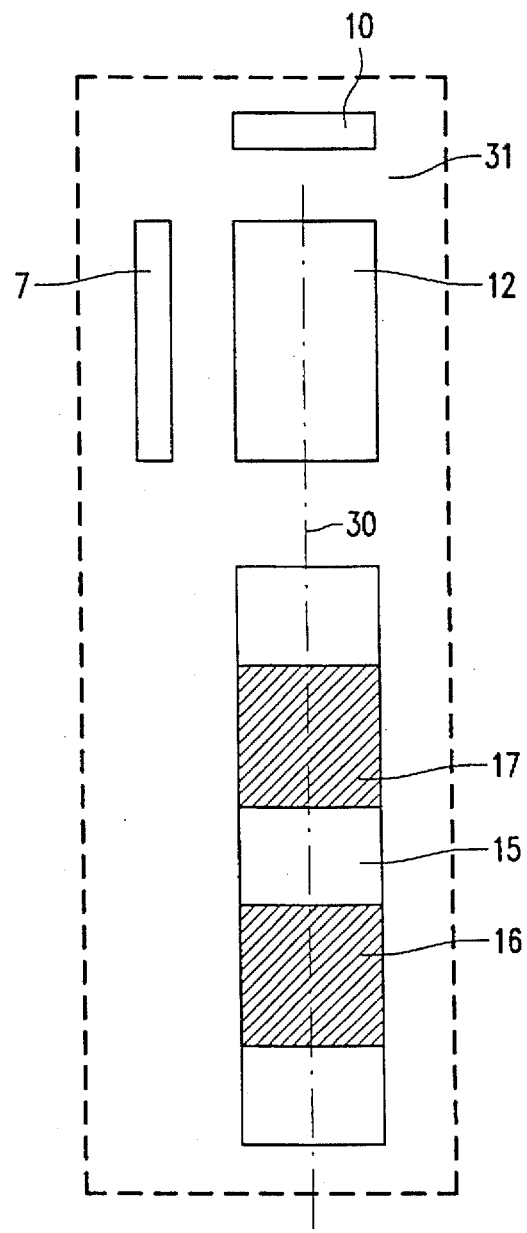
FIG. 5 shows a further embodiment of a circuit arrangement according to the invention.

FIG. 5 diagrammatically shows a further embodiment of a circuit arrangement according to the invention. The Figure shows the winding form 15 with the strip areas 16 and 17 constituting the two series arrangements 2, 3. Outside the winding form 15 and perpendicular thereto, the EHT output capacitor 12 is arranged in such a way that it is located symmetrically with respect to the central axis 30 of the winding form 15. Moreover, the position of the EHT divider resistor 7 and of the series resistor 10 next to, and above, the EHT output capacitor 12 is visible. All elements referred to are potted into one component 31 which can be mounted perpendicularly on a circuit board in the position shown in FIG. 5. Consequently, only a small space is occupied on the circuit board and the larger space requirement in the height direction does not play any role in monitors because there is enough space available. Since the EHT output capacitor 12 is arranged in the upper part of the component 31, its leakage field is also further remote from other components mounted on the circuit board. Moreover, this arrangement provides a satisfactory capacitive decoupling between the input of the EHT cascade circuit 1 and the EHT output capacitor 12.

Figure 6:
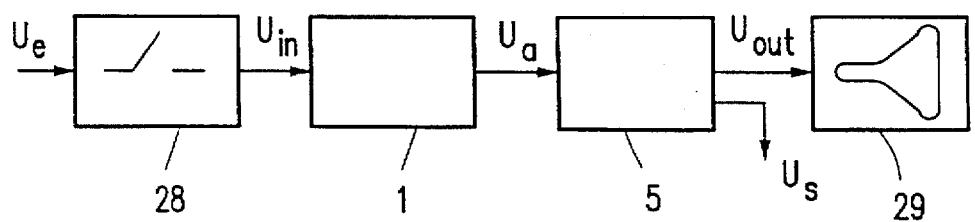
FIG. 6 is a block diagram illustrating a DC converter for a display tube.

FIG. 6 is a block diagram illustrating a DC converter for a display tube. The reference numeral 28 denotes a unit for forming the AC voltage $U_{in}$ from a DC voltage $U_e$ present at an input. The reference numeral 1 denotes the EHT cascade circuit which transforms the AC voltage $U_{in}$ into the DC output voltage $U_a$ with a high voltage value. The divider circuit 5 generates a control voltage $U_s$ representing a low voltage of the voltage $U_a$. The stable DC voltage $U_{out}$ with a high voltage value is present at a display tube 29 connected at the output.

The two series arrangements of capacitors are wired in such a way that connecting wires projecting from the circuit arrangement are attached to the strip areas constituting the capacitors. Advantageously, the series arrangements are wired in such a way that the capacitors present at the input of the EHT cascade circuit are located on the outer side of the circuit arrangement, and that the capacitors present at the output of the EHT cascade circuit are located on the inner side, right above the shielding foil.

The number of capacitors in the EHT cascade circuit and the diode coupling mode are not important to the invention.

In an alternative circuit arrangement, the series resistor 10 may be arranged directly at the output of the circuit, between the EHT divider resistor 7 and the load capacitance 11, instead of at the position shown in FIG. 1. However, this leads to a smaller harmonic attenuation than in the arrangement shown in FIG. 1.

The circuit arrangement shown in FIG. 2 is manufactured in such a way that an insulating foil is wound about the EHT output capacitor formed as a wound capacitor, and in that a conductive layer is wound about the insulating foil for shielding purposes. Subsequently, the dielectric layer with the conductive strips is wound about this shielding layer to form the circuit arrangement.

The circuit arrangement may also be manufactured by realizing the winding form 15 (see FIG. 2) and the winding forms 15a and 15b (see FIG. 4) in separate operations and by subsequently sliding them on the EHT output capacitor 12 wound with the insulating foil 13 and the shielding foil 14.

Except for the low-voltage capacitors and the diodes, the EHT cascade circuit and the divider circuit are advantageously potted as one component. Instead of the, hitherto usual, two parts, namely the EHT cascade circuit and the divider circuit, only this compact combination needs to be potted as one part.

I claim:

1. A circuit arrangement including an EHT cascade circuit with at least a series arrangement of capacitors comprising staggered conductive strips provided on both sides of a dielectric layer which, together with the conductive strips, is wound about a support to constitute a winding form, characterized in that the EHT cascade circuit precedes an EHT output capacitor, and the EHT output capacitor is the support.

2. A circuit arrangement as claimed in claim 1, characterized in that the EHT output capacitor is wound with an insulating foil, while a conductive shielding foil is wound about the insulating foil.

3. A circuit arrangement as claimed in claim 1, characterized in that the capacitor of the series arrangement located most proximate to the output of the EHT cascade circuit is constituted by the inner windings of the winding form.

4. A circuit arrangement comprising two series arrangements (2, 3) of capacitors as claimed in claim 1, characterized in that the conductive strips constituting the two series arrangements of capacitors are provided parallel to each other in the winding direction on a common dielectric layer.

5. A circuit arrangement including an EHT cascade circuit with at least a series arrangement of capacitors comprising staggered conductive strips provided on both sides of a dielectric layer which, together with the conductive strips, is wound about a support to constitute a winding form, characterized in that the EHT cascade circuit precedes an EHT output capacitor, and in that the EHT output capacitor is arranged outside the winding form on the central axis of the winding form.

6. A DC converter including a circuit arrangement having an EHT cascade circuit with at least a series arrangement of capacitors comprising staggered conductive strips provided on both sides of a dielectric layer which, together with the conductive strips, is wound about a support to constitute a winding form, characterized in that the EHT cascade circuit precedes an EHT output capacitor, and the EHT output capacitor is the support, said DC converter comprising two diode-coupled series arrangements of capacitors of an EHT cascade circuit and an EHT output capacitor following the EHT cascade circuit, characterized in that the EHT output capacitor is the support for the winding forms constituting the two series arrangements of capacitors, and in that the EHT cascade circuit is preceded by a unit for generating an AC voltage from the DC input voltage.

* * * * *